Dec. 3, 1929.  J. A. WELLINGTON  1,737,987
SIGNALING MECHANISM
Filed Nov. 27, 1928  2 Sheets-Sheet 1
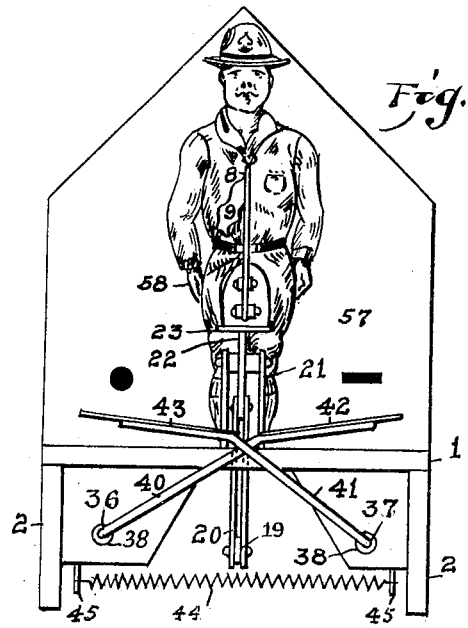
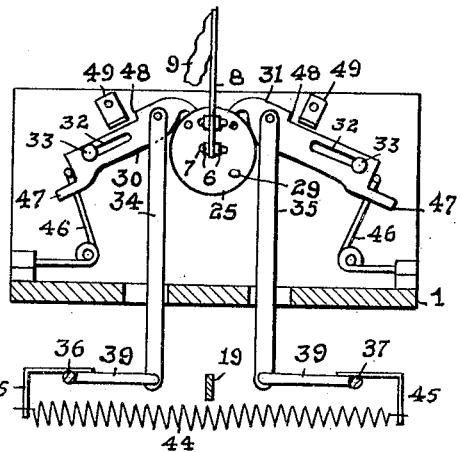
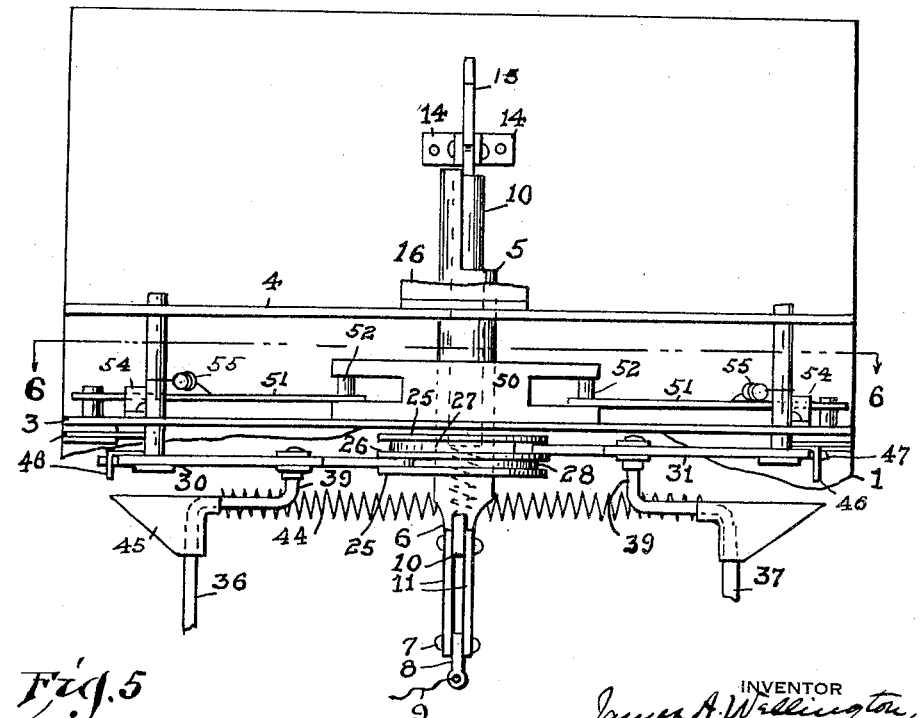
INVENTOR
James A. Wellington,
by Edward A. Lawrence
his Attorney Dec. 3, 1929.   J. A. WELLINGTON   1,737,987
SIGNALING MECHANISM
Filed Nov. 27, 1928   2 Sheets-Sheet 2
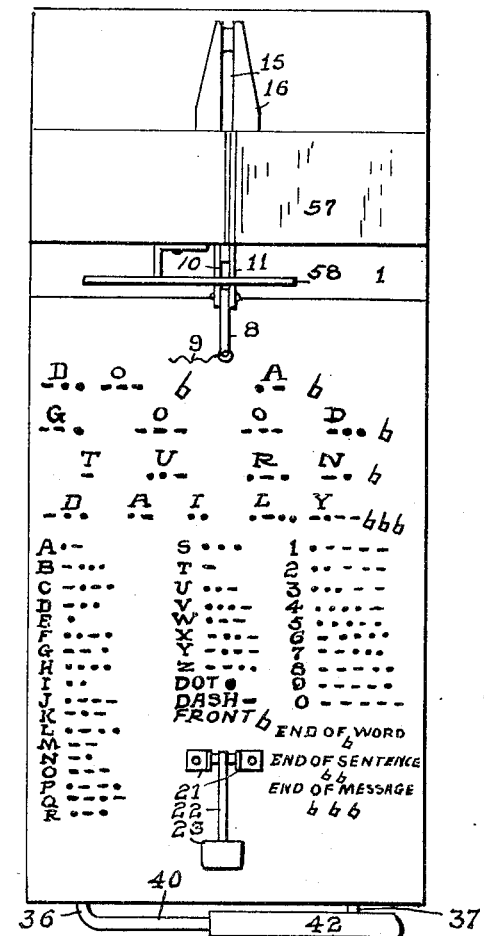
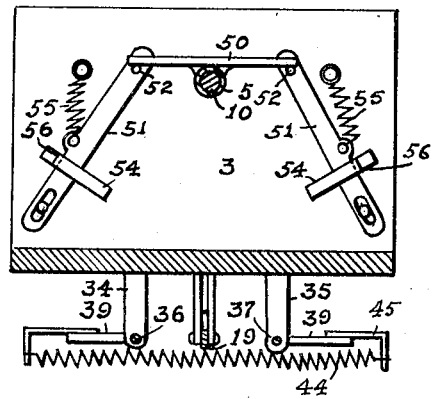
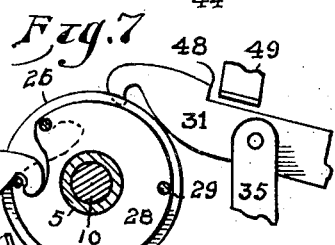
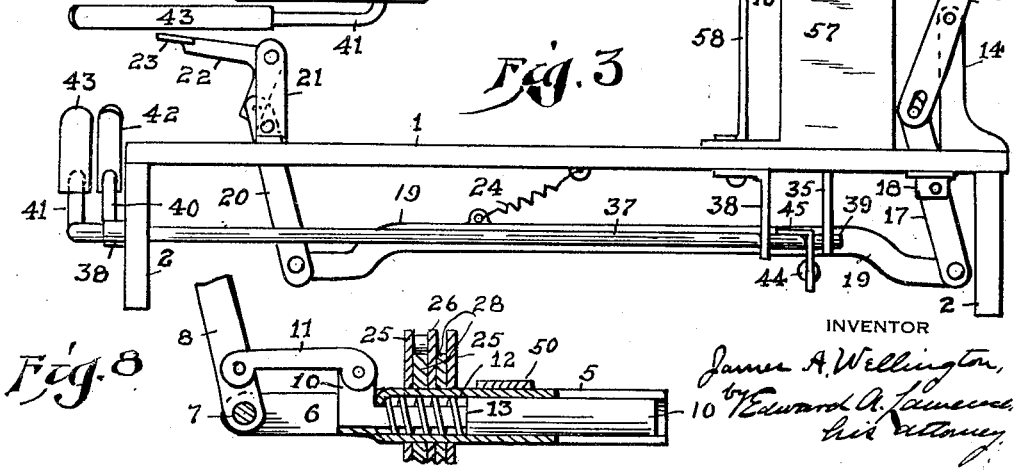
INVENTOR
James A. Wellington,
by Edward A. Lawrence
his Attorney Patented Dec. 3, 1929

1,737,987

UNITED STATES PATENT OFFICE

JAMES A. WELLINGTON, OF WESTMONT, PENNSYLVANIA, ASSIGNOR OF ONE-HALF TO RAY PATTON SMITH, ESQ., OF JOHNSTOWN, PENNSYLVANIA

SIGNALING MECHANISM

Application filed November 27, 1928. Serial No. 322,176.

Flag signaling is extensively used in the Army and Navy, and also by the Boy Scouts, and others, the flag being dipped to the right to indicate the dots in the Morse or general service code and to the left to indicate the dashes, while the flag is dipped forwardly or frontwise to indicate ends of words; ends of sentences, and ends of messages.

The learning of these code signals is a difficult task in the case of the average individual, and therefore much time, that could otherwise be employed to great advantage, is thus consumed and the learner lacks proficiency.

The object which I have in view is the provision of a small, compact and inexpensive mechanism, which may be used as an instruction device or as an educational toy or game, and by whose use the soldier, sailor, boy scout, child or other user may quickly and accurately learn the code and the transmission of messages therein by flag signaling.

For the accomplishment of this purpose I have invented a compact and convenient mechanism which comprises a movable flag connected up to a lever system so that the flag may be at will dipped to either side or frontwise.

The flag is preferably associated with a dummy or the representation of a human figure, such as that of a boy scout, in such a manner that the dummy appears to be dipping the flag.

In the preferred embodiment of my invention separate levers, operated by the hands of the learner, are provided for each characteristic movement of the flag toward either side of the figure and frontwise.

In front of the position of the flag and the dummy, and thus before the eyes of the user, a table is displayed upon which the signaling code and the corresponding values in letters and the like is displayed.

Thus the user may spell out the words, sentences and messages in the code and by operating the proper levers translate them into flag signals.

Frequently the beginner is confused by the fact that flag signals are received in a manner the reverse of sending.

Thus, the student when sending indicates dots by dipping his flag toward the right and dashes by dipping his flag toward the left, but when he receives a message the other person's flag is dipped toward the receiver's left for dots and toward the receiver's right for dashes. Thus, I have provided what may be termed a cross-over lever arrangement whereby when the user operates the right hand key to transmit a dot or the left hand key to transmit a dash, the flag is dipped in the opposite direction, so that the user reads the signal just as he would in outdoor signaling.

Again to avoid unnecessary confusion and thus assist the beginner I have provided that a signal cannot be made until a previously given signal is completed and the flag has returned to its idle or neutral position.

Other novel features of construction, and also of arrangement of parts, will appear from the following description.

In the accompanying drawings, wherein I have illustrated the best embodiment of the principles of my invention now known to me.

Fig. 1 is a front elevation of the instruction-mechanism, the housing and human figure being shown.

Fig. 2 is a plan view of the same.

Fig. 3 is a broken side elevation of the same with parts omitted.

Fig. 4 is a detail in front elevation of the flag moving mechanism, the housing being removed.

Fig. 5 is a plan view of the same on larger scale.

Fig. 6 is a sectional view taken along the line 6—6 in Fig. 5 but on smaller scale.

Fig. 7 is an enlarged detail of the pawls and associate parts.

Fig. 8 is a detail of certain of the parts employed for moving the flag frontwise.

Referring to the drawings, 1 represents a horizontal platform preferably of rectangular shape and supported on relatively short legs 2.

3 and 4 represent a pair of vertical and spaced apart plates mounted on and disposed transversely of the platform 1 and adjacent to the rear end thereof.

Journaled in said plates is the horizontal, tubular shaft 5 whose protruding front end is vertically flattened and bifurcated to form the parallel forks 6 between which is pivoted, as on the bolt 7, the butt end of the staff 8 which carries the signaling flag 9.

It is evident that the flag may be waved to either side by rotating the shaft 5.

Nested in the tubular shaft 5 and slidable longitudinally thereof is a second shaft 10 whose front end is connected by the parallel links 11 to a point on the staff 8 spaced from the bolt 7.

It is evident that the flag will be moved frontwise, that is in the vertical plane of the longitudinal axis of the platform 1, by the longitudinal movement of the shaft 10.

A helical spring 12 is coiled about the shaft 10 within the tubular shaft 5 between the punched front portion of the shaft 5 and a shoulder 13 on the shaft 10, thus normally holding the staff 8 in its raised or vertical position and returning it thereto.

14 represents twin stands rising from the platform 1 behind the plate 4, and 15 a rocking lever pivotally mounted intermediate of its ends between said stands. The upper end of the lever 15 is guided between the arms of a forked bracket 16 extending rearwardly from the plate 4.

The lower end of the lever 15 has a pin and slot pivotal connection to the upper end of a second rocking lever 17 which extends through a slot in the platform 1 and is pivotally mounted intermediate of its ends between the twin brackets 18 depending from the platform at either side of the slot.

The lower end of the lever 17 is pivotally connected to the rear end of a link 19 which extends forward under the platform and is pivotally connected at its front end to the lower end of a third rocking lever 20 which extends up through a slot near the front end of the platform.

The lever 20 is pivotally mounted intermediate of its ends between the twin stands 21 extending up from the platform on either side of said slot.

A bell crank lever 22 is pivotally mounted at its angle between said stands and has its lower end connected by a loose pivot to the upper end of the lever 20.

The upper arm of the bell crank lever 22 extends forwardly of the platform and is provided with a key 23.

When the key 23 is pressed down, the upper end of the lever 17 is swung forwardly and engages the rear end of the nested shaft 10, moving said shaft forwardly in the tubular shaft 5 and thus causing the flag to dip downwardly.

The spring 12 raises the flag to its elevated position when pressure is relieved from the key 23.

To retract the lever 17 and raise the key when the pressure is relieved from the latter, I employ a spring 24 connected to the link 19 and extending towards the rear and connected to the under side of the platform 1.

It is thus evident that by means of the key 23 the flag may be made to dip forwardly or frontwise, motions which are employed to indicate ends of words, sentences and messages in flag signaling.

In front of the plate 3 the tubular shaft 5 has fixed thereon a double ratchet wheel comprised of front and rear side plates 25, the intermediate partition plate 26 and the two notched ratchet disks 27 and 28. These parts are connected rigidly together as by the riveted pins 29.

30 and 31 represent a pair of oppositely disposed pawls whose butts are longitudinally slotted as at 32 so that the pawls have a sliding pivotal mounting on the pivot bolts 33 mounted on the front of the plate 3.

The side plates 25 and the partition plate 26 are of sufficient diameter to extend outwardly beyond the disks 27 and 28 and thus act as shrouds to guide the pawls.

Near their front ends the pawls are pivotally connected respectively to the upper ends of the links 34 and 35 which extend down through holes in the platform 1.

36 and 37 represent a pair of shafts extending longitudinally beneath the platform 1 and on either side of the longitudinal axis of said platform. Suitable bearings 38 are provided for said shafts.

The rear ends of the shafts 36 and 37 are bent inwardly to form the cranks 39 whose ends are pivotally connected to the lower ends of the links 34 and 35 respectively.

The front ends of the shafts 36 and 37 extend beyond the front end of the platform 1 and are bent inwardly and upwardly to form the crank handles 40 and 41 respectively and which are provided with flat keys 42 and 43 respectively, which cross over as shown and which are depressed to rotate the shafts. When the key 42 is depressed, the link 34 draws down the pawl 30 which engages the ratchet disk 27 and thus causes the shafts 5 and 10 to rotate counterclockwise in Fig. 4.

When the key 43 is depressed the pawl 31 is swung downward to engage the ratchet disk 28 and thus rotate the shafts 5 and 10 in a clockwise direction.

Thus the key 42 is employed to dip the flag toward the left in Fig. 1 and the key 43 to dip the flag to the right in Fig. 1.

A spring 44 connects the brackets 45 carried by the cranks 39, thus automatically raising the key and disengaging the corresponding pawl from the ratchet disk when pressure is relieved from a key.

When idle the pawls are resiliently held in their elevated and retracted positions shown in Fig. 4, and when relieved of lever pressure are automatically returned to such positions by means of springs 46 mounted on the front of plate 3 and bearing against the butt ends of the pawls but below their axis of pivotal movement.

Thus when a pawl has been operated to rotate the tubular shaft, as shown in the case of the pawl 30 in Fig. 7, and the pressure on the corresponding key is relieved, the corresponding spring 46 will retract the pawl out of engagement with its disk and into its elevated position as shown in the case of pawl 31 in Fig. 7 and in the case of both pawls in Fig. 4.

The butt end of the pawl is preferably provided with a projection 47 around which the end of the spring may be hooked to maintain connection.

The upper edges of the pawls are provided with shoulders 48 which when the pawl is elevated are adjacent to a stop bracket 49 on the plate 3, so should one of the pawls be operated to rotate the tubular shaft 5, as in the case of pawl 30 in Fig. 7, the operation of the other pawl by means of its corresponding key is prevented by the engagement of the shoulder 48 with the bracket 49 as the pawl 31 cannot move directly downwardly owing to the fact that the notch in the disk 28 has been rotated counter-clockwise out of registration with said pawl.

Thus it is evident that a key cannot be depressed to dip the flag in one direction while the other key is depressed nor can the flag be dipped to either side until it has first returned to neutral after being dipped to the opposite side.

Means are provided for normally maintaining the flag staff in its intermediate or vertical position and to automatically return it thereto after it has been dipped laterally in either direction.

Thus between the plates 3 and 4 a cross head 50 is fixed on the tubular shaft 5 and so disposed that when the staff 8 is in its intermediate position the cross head is horizontal.

The ends of the cross head are forked to straddle the upper ends of a pair of levers 51 and rest upon pins 52 extending transversely through said levers. The lower ends of the levers 51 are longitudinally slotted to provide a sliding pivotal mounting of the levers on the headed pins 53 extending rearwardly from the plate 3 near the bottom corners of said plate.

The levers are held against the rear side of the plate 3 by means of the bent metal keepers 54 attached to the plate 3.

Springs 55 tend to hold the upper ends of the levers in their raised position and to return them thereto. The rising movements of the levers 51 are limited by engagement with the shoulders 56 of the keepers so that neither lever tends to swing the cross head beyond the horizontal.

It is evident that when the tubular shaft 5 is rotated to either side of its axis, the corresponding lever 51 is forced downwardly by the cross head 50 and when the pressure is relieved the corresponding spring 55 will cause the lever to rise, thus swinging the cross head back into its horizontal position.

It will be noted that the tubular shaft 5 extends to and preferably slightly beyond the rear end of the nest shaft 10 and that the rear portion of said tubular shaft is cut away for slightly more than half its circumference.

Furthermore the shafts are so assembled with their operating parts that when the tubular shaft 5 is at its neutral or centered position as illustrated in Fig. 8, the cut away portion of the tubular shaft provides clearance for the engagement of the rear end of the nested shaft by the upper end of the lever 15, so that the nested shaft may be moved horizontally to dip the flag frontwise.

However if the tubular shaft be rotated to either side, its rear end is interposed in the path of the lever 15 so as to prevent said lever engaging the shaft 10.

Thus a signal cannot be given by a frontwise dipping of the flag while a sidewise dipping of the flag is being made or until such latter has been completed and the tubular shaft has been returned to neutral.

It is further evident that while the flag is being dipped frontwise the upper end of the lever 15 will move inwardly past the rear extremity of the shaft 5, and thus if an attempt be made to rotate shaft 5 in either direction the sides of its cut away portion will engage said lever and prevent such rotation.

The flag operating mechanism carried by the plates 3 and 4 together with said plates are normally concealed by a sheet metal housing 57 which may be shaped and colored to represent a tent, foliage or camp scene. The housing is provided with an aperture in its front wall through which the shafts 5 and 10 protrude.

I also prefer to mount a dummy of some sort, such as the figure of a person, such as a boy scout, shown at 58 in front of the housing 57, the figure being also apertured to give clearance for the shafts 5 and 10 so that the flag is in front of the human figure and the staff appears to be wagged by the figure.

On the platform 1 is displayed, as by lithographing or pasting thereon a printed sheet, the Morse code and the letters and other values indicated thereby.

Thus the user may place the mechanism before him on a table or other support and conveniently study and practice signaling.

My invention may be made of any suitable material, many of the parts of sheet metal.

Among the marked advantages of my invention is that due to the fact that a signal, dot or dash, is made by the proper hand, the right or left, of the user and is registered at the other side of the user by the dummy.

The user thus transmits and receives simultaneously, receiving at his left the signals made by his right hand and vice versa, just as in out of door flag signaling.

This greatly increases the instructive value of the device and enables the learner to become skillful much more quickly than by means of the method and apparatus of instruction now in use.

Again, owing to the fact that the operating key mechanism is interlocking, one signal must be completed and the flag returned to neutral before a different signal may be given. This prevents confusion and irregularity in signaling, and aids the user to become proficient.

What I desire to claim is:—

1. In a signaling device, the combination of a horizontally disposed shaft arranged for rotation on its longitudinal axis, a flag-staff mounted on said shaft and normally extending in angular relation thereto, selective means for rotating said shaft whereby said shaft may be dipped to either side, and means for dipping said staff in a substantially vertical plane which includes the axis of said shaft.

2. In a signaling device, the combination of a horizontally disposed shaft arranged for rotation on its longitudinal axis, a flag-staff mounted on said shaft and normally extending in angular relation thereto, selective means for rotating said shaft whereby said staff may be dipped to either side, and means for dipping said staff in a substantially vertical plane which includes the axis of said shaft, and means whereby said staff is normally returned to and maintained in its neutral position.

3. In a signaling device, the combination of a horizontally disposed shaft arranged for rotation on its longitudinal axis, a second shaft disposed in parallelism with the first shaft and arranged for longitudinal movement relative to said first shaft, a flag-staff pivotally mounted on the first shaft, selective means for rotating the first shaft whereby the flag-staff may be dipped to either side, connections between said flag-staff and said second shaft whereby the longitudinal movement of the latter causes said flag-staff to dip in a substantially vertical plane which includes the axis of said second shaft, and means for moving said second shaft.

4. In a signaling device, the combination of a horizontally disposed shaft arranged for rotation on its longitudinal axis, a second shaft disposed in parallelism with the first shaft and arranged for longitudinal movement relative to said first shaft, a flag-staff pivotally mounted on the first shaft, selective means for rotating the first shaft whereby the flag-staff may be dipped to either side, connections between said flag-staff and said second shaft whereby the longitudinal movement of the latter causes said flag-staff to dip in a substantially vertical plane which includes the axis of said second shaft, means for moving said second shaft, and means for normally returning the flag-staff to and maintaining it in its neutral position.

5. In a signaling device, the combination of a horizontally disposed tubular shaft arranged for rotation on its longitudinal axis, a second shaft nested in the tubular shaft and movable longitudinally therein, a flag-staff pivotally mounted on the tubular shaft, selective means for rotating said tubular shaft whereby the flag-staff may be dipped to either side, connections between the nested shaft and the flag-staff whereby the longitudinal movement of the nested shaft causes said flag-staff to be dipped in a substantially vertical plane including the axis of the tubular shaft, and means for moving said nested shaft.

6. In a signaling device, the combination of a horizontally disposed tubular shaft arranged for rotation on its longitudinal axis, a second shaft nested in the tubular shaft and movable longitudinally therein, a flag-staff pivotally mounted on the tubular shaft, selective means for rotating said tubular shaft whereby the flag-staff may be dipped to either side, connections between the nested shaft and the flag-staff whereby the longitudinal movement of the nested shaft causes said flag-staff to be dipped in a substantially vertical plane including the axis of the tubular shaft, means for moving said nested shaft, and means whereby said flag-staff is normally returned to and maintained in its neutral position.

7. In a signaling device, the combination of a platform, a flag-staff mounted at the rear end of said platform and arranged for movement to transmit flag signals, and selective lever mechanism operatively connected to said flag-staff and extending to the other end of said platform whereby the flag-staff may be dipped in more than one plane.

8. In a signaling device, the combination of a platform having displayed thereon a signaling code and its word values, a flag-staff mounted at the rear of said platform and arranged for movement to transmit flag signals, and selective lever mechanism operatively connected to said flag-staff and extending to the front end of the platform whereby the flag-staff may be dipped in more than one plane in accordance with the code.

9. In a signaling device, the combination of a platform having displayed thereon a signaling code and its word values, a flag-staff mounted at the rear of said platform and arranged for movement in more than one place to transmit flag signals, selective lever mechanism operatively connected to said flag-staff and extending to the front end of the platform whereby the flag-staff may be dipped in different directions in accordance with the code, and means whereby said flag-staff is normally returned to and maintained in its neutral position.

10. In a signaling device, the combination of a platform, a housing at the rear end of the platform, the representation of a dummy in front of said housing, a flag-staff associated with the dummy, means in said housing arranged for dipping said flag-staff to either side of said dummy, and selective lever mechanism for actuating said means and extending to the front end of the platform.

11. In a signaling device, the combination of a platform, a housing at the rear end of the platform, the representation of a dummy in front of said housing, a flag-staff associated with the dummy, means in said housing arranged for dipping said flag-staff to either side of said dummy, selective lever mechanism for actuating said means and extending to the front end of the platform, and means whereby said flag-staff is normally returned to and maintained in its neutral position.

12. In a signaling device, the combination of a horizontally disposed shaft arranged for rotation on its longitudinal axis, a flag-staff mounted on said shaft, and lever mechanisms for rotating said shaft in either direction whereby to dip said flag to either side, said lever mechanisms being arranged so that the user actuates the same at his one side to dip the flag toward his other side.

13. In a signaling device, the combination of a horizontally disposed shaft arranged for rotation on its longitudinal axis, a flag staff mounted on said shaft, and lever mechanisms for rotating said shaft in either direction whereby to dip said flag to either side, said mechanisms having a cross-over relation to each other so that the user actuates the same at his one side to dip the flag toward his other side.

14. In a signaling device, the combination of a platform having displayed thereon the signaling code and its language values, a housing at the rear end of the platform, a dummy in front of said housing, a flag-staff associated with the dummy, means in said housing arranged for dipping said flag-staff to either side of said dummy, and selective lever mechanism for actuating said means and extending to the front end of the platform.

15. In a signaling device, the combination of a platform having displayed thereon the signaling code and its language values, a housing at the rear end of the platform, a dummy in front of said housing, a flag-staff associated with the dummy, means in said housing arranged for dipping said flag-staff to either side of said dummy, selective lever mechanism for actuating said means and extending to the front end of the platform, and means whereby said flag-staff is normally returned to and maintained in its neutral position.

16. In a signaling device, the combination of a platform, a housing at the rear end of the platform having displayed thereon the signaling code and its language values, a dummy in front of said housing, a flag-staff associated with said dummy and arranged for movement in more than one plane, means in said housing for dipping said flag-staff toward either side and toward the front end of said platform, and selective lever mechanism for actuating said means and extending to the other end of said platform.

17. In a signaling device, the combination of a platform, a housing at the rear end of the platform having displayed thereon the signaling code and its language values, a dummy in front of said housing, a flag-staff associated with said dummy and arranged for movement in more than one plane, means in said housing for dipping said flag-staff toward either side and toward the front end of said platform, selective lever mechanism for actuating said means and extending to the other end of said platform, and means for normally returning said flag-staff to and maintaining it in its neutral position.

18. In a signaling device, the combination of a horizontally disposed shaft arranged for rotation on its longitudinal axis, a flag-staff mounted on said shaft, selective means for rotating said shaft whereby said shaft may be dipped to either side, means for dipping said staff in a substantially vertical plane which includes the axis of said shaft, and means whereby a movement of the staff is prevented until the staff has first attained its neutral position.

19. In a signaling device, the combination of a horizontally disposed shaft arranged for rotation on its longitudinal axis, a flag-staff mounted on said shaft, selective means for rotating said shaft whereby said staff may be dipped to either side, and means for dipping said staff in a substantially vertical plane which includes the axis of said shaft, means whereby said staff is normally returned to and maintained in its neutral position, and means whereby a movement of the staff is prevented until the staff has first attained its neutral position.

20. In a signaling device, the combination of a platform having displayed thereon a signaling code and its word values, a flag-staff mounted at the rear of said platform and arranged for movement to transmit flag signals, selective lever mechanism operatively connected to said flag-staff and extending to the front end of the platform whereby the flag-staff may be dipped in different directions in accordance with the code, and means whereby a dipping of the staff is prevented until the staff has first attained its neutral position.

Signed at Johnstown, Pa., this 9th day of October, 1928.

JAMES A. WELLINGTON.